United States Patent
Adams

(10) Patent No.: US 10,368,029 B2
(45) Date of Patent: Jul. 30, 2019

(54) ELECTRONIC DEVICE AND METHOD FOR PROJECTION OF DISPLAYED CONTENT

(71) Applicant: BlackBerry Limited, Waterloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/730,558

(22) Filed: Oct. 11, 2017

(65) Prior Publication Data

US 2019/0110018 A1    Apr. 11, 2019

(51) Int. Cl.
*H04N 5/74* (2006.01)
*G02B 27/01* (2006.01)

(52) U.S. Cl.
CPC ........... *H04N 5/7491* (2013.01); *G02B 27/01* (2013.01)

(58) Field of Classification Search
CPC ............... G02B 27/01; G02B 27/0101; G02B 27/00–27/0189; G06F 3/00–3/167; G06F 1/00–1/3296
See application file for complete search history.

(56) References Cited

U.S. PATENT DOCUMENTS

| | | |
|---|---|---|
| 9,075,451 B2 | 7/2015 | Gaerdenfors et al. |
| 2007/0112444 A1 | 5/2007 | Alberth, Jr. et al. |
| 2011/0125397 A1* | 5/2011 | Lee ..................... G01C 21/365 701/533 |
| 2011/0210926 A1 | 9/2011 | Pasquero et al. |
| 2013/0222231 A1* | 8/2013 | Gardenfors ........... G06F 1/1626 345/156 |
| 2014/0146304 A1 | 5/2014 | Almalki |
| 2015/0054760 A1 | 2/2015 | Amaru et al. |
| 2016/0025973 A1* | 1/2016 | Guttag ............... G02B 27/0101 345/7 |
| 2016/0049017 A1* | 2/2016 | Busse .................... G07C 5/008 701/33.3 |
| 2016/0080163 A1 | 3/2016 | Taylor |

FOREIGN PATENT DOCUMENTS

WO    2016123248 A1    8/2016

OTHER PUBLICATIONS

European Patent Application No. 18198125.9, Extended European Search Report dated Jan. 25, 2019.
Sharon., "The Most Practical, Creative Ways to Use NFC With Your Android Device," Mar. 30, 2014, 3 pages. [retrieved on Jan. 21, 2019], Retrieved from the Internet: [URL: https://www.cnet.com/how-to/the-most-practical-creative-ways-to-use-nfc-with-your-android-device/].

* cited by examiner

*Primary Examiner* — Cara E Rakowski
*Assistant Examiner* — Christopher A Lamb, II
(74) *Attorney, Agent, or Firm* — Borden Ladner Gervais LLP; Todd Keeler

(57) ABSTRACT

An electronic device and method include receiving one of a plurality of projection-mode triggers, each projection-mode trigger having associated projection-mode display parameters, based on the received projection-mode trigger, initiating a projection mode at the electronic device, receiving, from an application, content information for display on a display of the electronic device, altering the content information based on the display parameters associated with the received one of the plurality of projection-mode triggers to generate altered content information, and displaying the altered content information on the display of the electronic device.

17 Claims, 5 Drawing Sheets

ELECTRONIC DEVICE AND METHOD FOR PROJECTION OF DISPLAYED CONTENT

FIELD OF TECHNOLOGY

The present disclosure relates to electronic devices including, but not limited to, portable electronic devices and to projecting content displayed on the electronic device.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

In certain circumstances, an electronic device may be operated such that the content displayed on the electronic device is projected onto a surface. However, the quality of the image projected onto the surface may be affected by aspects of the particular surface being projected onto.

Improvements in devices and in methods and systems for projecting content displayed on electronic devices are desirable.

BRIEF DESCRIPTION OF THE DRAWINGS

Embodiments of the present disclosure will now be described, by way of example only, with reference to the attached figures, in which:

FIG. 2B is a schematic diagram of an example electronic device projecting content onto a surface that the electronic device is resting on;

DETAILED DESCRIPTION

Figure 1:
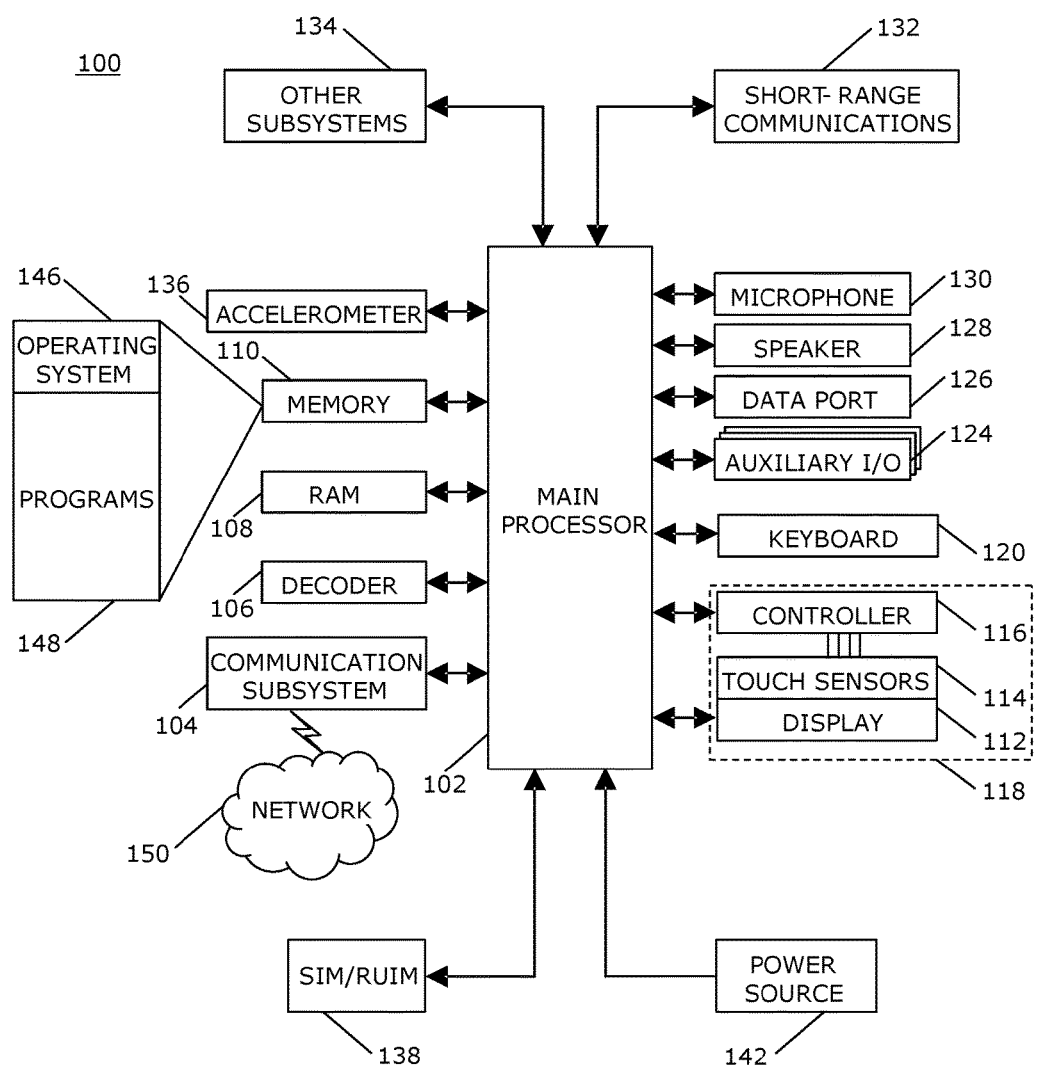
FIG. 1 is a block diagram of an example of an electronic device in accordance with the disclosure.

The following describes an electronic device and a method for utilizing different projection parameters associated with different projection-mode triggers for projecting the contents displayed on the electronic device. The method includes receiving one of a plurality of projection-mode triggers, each projection-mode trigger having associated projection-mode display parameters, based on the received projection-mode trigger, initiating a projection mode at the electronic device, receiving, from an application, content information for display on a display of the electronic device, altering the content information based on the display parameters associated with the received one of the plurality of projection-mode triggers to generate altered content information, and displaying the altered content information on the display of the electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and may include a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

In some instances, it may be desirable for a user to view the display 112 indirectly. In order for the user to view the display 112 indirectly, the electronic device 100 may be in a projection-mode in which the display 112 projects displayed information onto a reflective surface. The user then views the displayed information on the reflective surface, rather than viewing the display 112 directly.

Figure 2A:
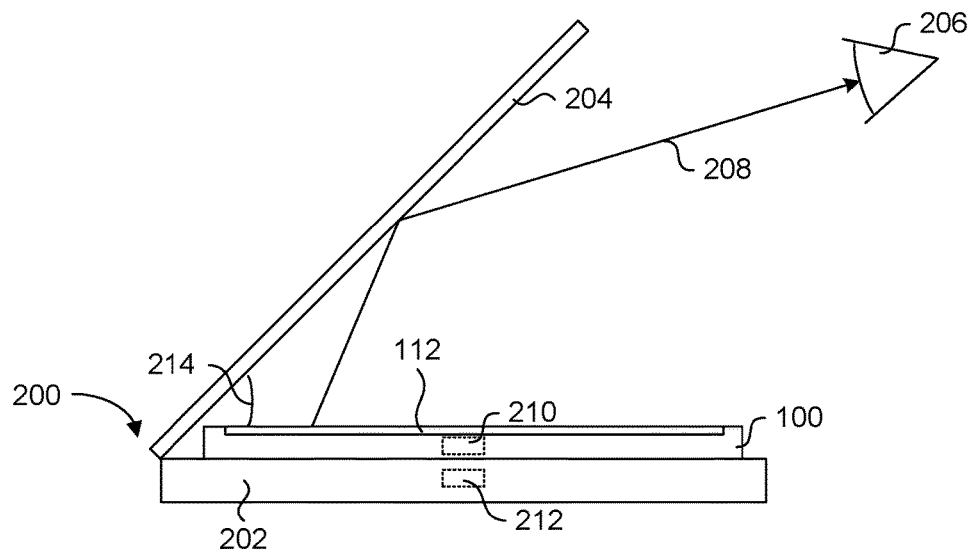
FIG. 2A is a schematic diagram of an example electronic device projecting content onto a reflector of a heads-up display cradle.
Figure 2B:
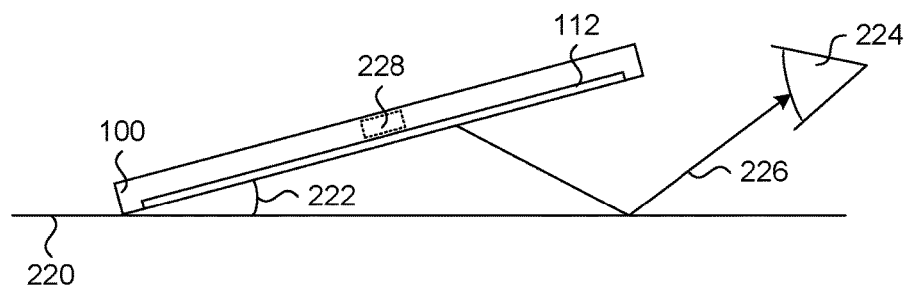

FIGS. 2A and 2B show two examples for indirect viewing information displayed on the display 112 of an electronic device 100. FIG. 2A shows an electronic device 100 that is placed in a heads-up display (HUD) cradle 200. The example HUD cradle 200 shown in FIG. 2A includes a base 202 and a reflector 204. When the electronic device 100 is placed display up on the base 202, the contents of the display 112 are projected onto the reflector 204. The reflector 204 may include a reflective surface, or otherwise be formed of a suitable material, such that the content projected by the display 112 is reflected into the eye 206 of a user, as illustrated by arrow 208.

Optionally, the electronic device 100 may include a sensor 210 that detects when the electronic device is placed in the HUD cradle 200. As discussed in more detail below, in response to detecting by the sensor 210 that the device 100 has been placed in the HUD cradle 200, the device 100 may initiate a projection-mode in which the contents displayed on the display 112 are adjusted based on projection parameters associated with projecting onto a reflector 204 of a HUD cradle 200. In this example, detecting that the electronic device 100 is placed into the HUD cradle 200 may be referred to as a projection-mode trigger.

In an example, the sensor 210 may detect an optional stimulus element 212 included in the cradle 200 such that when the sensor 210 detects the presence of the stimulus element 212, a determination is made that the device has been placed in the HUD cradle 200. Any suitable sensor 210 and stimulus element 212 may be utilized. In an example, the stimulus element 212 may be a magnet, and the sensor 210 may be a hall sensor. In another example, the stimulus element 212 may be a protrusion, and the sensor 210 may be a button that engages with and is actuated by the protrusion when the electronic device is placed in the HUD cradle 200. In another example, the stimulus element 212 may be a near-field communication (NFC) tag, and the sensor 210 may be an NFC reader that reads a signal output by the NFC tag when the sufficiently close to the NFC tag.

In other examples, the sensor 210 may comprise two or more sensors that are utilized to determine that the electronic device 100 has been placed in the HUD cradle 200. For example, the sensor 210 may comprise an orientation sensor, such as accelerometer 136 or a gyroscope, that determines that the electronic device 100 is lying stationary on the back surface, with the display 112 facing upwards, and an optical sensor that determines that a reflective surface is located above the display 112. In this way, the electronic device 100 may determine, for example, that the device is placed on a dashboard of a vehicle under the windshield with the intention of projecting the contents of the display 112 off of the windshield for indirect viewing.

In another example, the sensor 210 may also be utilized to determine a reflectivity of the surface of the reflector 204, or to determine an angle 214 between the surface of the reflector 204 and the surface of the display 112 of the electronic device 100.

Referring now to FIG. 2B, another example of indirect viewing of contents of a display 112 of an electronic device 100 is shown by reflection off of a surface 220 that the electronic device 100 is resting or lying on. The surface 220 may be, for example, a table top. When the device is tilted up from the surface by an angle 222, the contents displayed on display 112 may be projected into the surface 220. For a sufficiently smooth surface 220, the contents may be reflected from the surface 220 into the eye 224 of a user, as illustrated by arrow 226.

Optionally, the electronic device 100 may include a sensor 228 that determines that the user intends to indirectly view the contents of display 112 through reflection from the surface 220. In an example, the sensor 228 may be an orientation sensor such as, for example, accelerometer 136 or a gyroscope. The sensor 228 may detect that the electronic device 100 is placed on the surface 220 with the display 112 facing downwards, then tilted by the angle 222. The sensor 228 may determine, for example, that the angle 222 meets or exceeds a threshold angle. The electronic device 100 may determine that indirect viewing is desired when, for example, the detected angle 222 at which the device 100 is tilted meets or exceeds the threshold angle.

Determining that the detected angle 222 meets the threshold angle may optionally further include determining the threshold angle is met when the is that the tilting of the device to the detected angle 222 meets or exceeds the threshold angle for a predetermined time period. In this way, the projection mode is not triggered until the electronic device 100 has been in the tilted position for a predetermined time to inhibit unintentional triggering of the projection mode.

As described in more detail below, in response to determining that indirect viewing on a surface 220 is desired, which is referred to in the present disclosure as a "projection-mode trigger", the electronic device 100 may initiate a projection-mode in which contents of the display are adjusted based on projection parameters associated with the particular projection mode trigger that is received.

An issue that arises when projecting the contents of the display 112 onto a surface is that the various parameters utilized to display the content on the display 112, referred to in the present disclosure as "projection parameters", that may be different for different projection surfaces. For example, the projection parameters that may be desirable for one projection onto, for example the reflector 204 of a HUD cradle 200 shown in FIG. 2A, may not be desirable for projecting the content onto, for example, a table top such as the surface 220 shown in FIG. 2B.

In addition, different HUD cradles 200 may utilize different materials for the reflector 204 resulting in differences in, for example, colour and reflectivity of the reflectors 204 and the angle 214 between the reflector 204 and the display 112. Therefore, the projection parameters that are desirable for projection of content onto the reflector 204 of one HUD cradle 200 may not be desirable for projection of that content onto the reflector 204 of a different HUD cradle 200.

In the case in which the projection surface is a surface 220 on which the electronic device 100 is placed, the projection parameters may be determined, in part, by characteristics of the surface 220. Projecting onto a surface 220 on which the electronic device 100 is resting may not be appropriate for all surfaces 220. For example, projection may not be practical into surfaces 220 having a matte surface, whereas surfaces 220 with high gloss surfaces may better facilitate projection facilitating more information being reflected at lower angles than, for example, semi-gloss surfaces.

In some examples, the electronic device 100 may include an additional sensor, such as a light sensor (not shown), that may be determine a texture of the surface, such as matte, semi-gloss, or high gloss. Determining the surface texture may include determining a reflecitivity of the surface 220. In this example, the projection parameters that are utilized in the projection mode may be based on the determined reflectivity. The reflectivity from the surface 220 may be determined, at least in part, by the surface texture of the surface 220. The light sensor utilized to determine the texture of the surface 220 may be, for example, a camera (not shown) of the electronic device 100. For example, a calibration image may be displayed on the display 112 in a calibration mode, and, based on the image of the reflected calibration image captured by the camera, the texture or reflectivity of the surface 220 may be determined. Determining the reflectivity of the surface may include determining the reflectivity for different colours to determine whether certain colours reflect better than other colours.

In order to address the issue that projection parameters that may be desirable for one reflective surface may not be desirable for a different reflective surface, the present disclosure provides an apparatus and method for utilizing different projection parameters for projecting the content of the display 112 onto different projection surfaces. Different types of indirect viewing result in a different projection-mode triggers being received at the electronic device 100. Each projection-mode trigger has respective projection parameters associated with it. The projection parameters are configured and optimized for the projection surface that is utilized in the type of indirect viewing associated with the received projection-mode trigger. Projection parameters are utilized to configure the contents displayed on display 112 and may include, for example, parameters for adjusting the brightness of display 112, the colour, size, and location of the content information displayed on the display 112, whether to mirror the displayed content, and the size and location of the region of the display on which the information is displayed.

For example, a projection-mode trigger associated with the type of indirect viewing in which the electronic device 100 is placed into a HUD cradle 200 may have projection parameters that are different than the projection parameters associated with the projection-mode trigger associated with the type of indirect viewing in which the electronic device 100 is tilted up from a surface 220. In another example, the different models of HUD cradles may be associated with different projection-mode triggers, each with different projection parameters that are configured based on, for example, the material utilized in the reflector of that model of HUD cradle.

Figure 3:
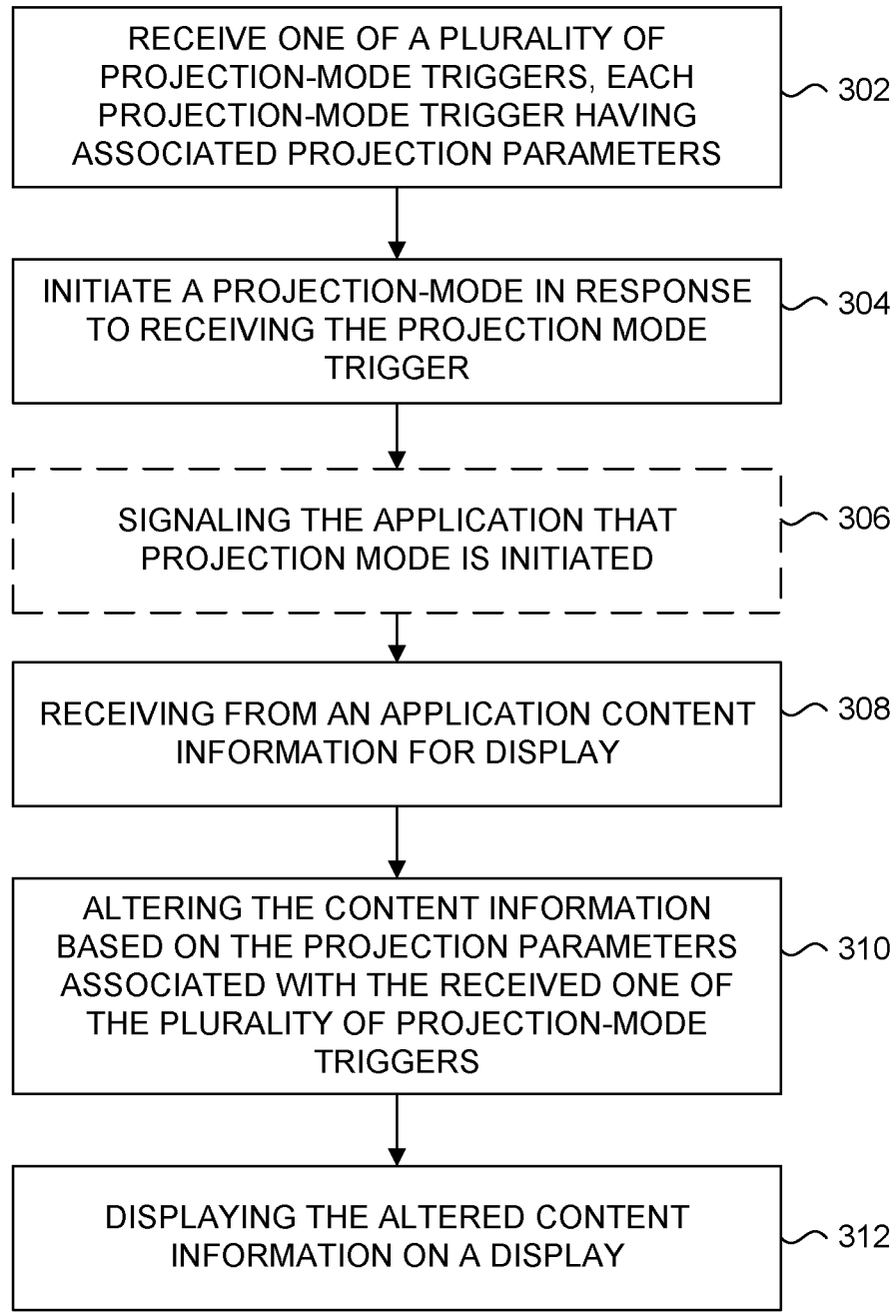
FIG. 3 is a flowchart illustrating a method of utilizing different projection parameters for different projection-mode triggers in accordance with an embodiment of the present disclosure.

FIG. 3 shows a flowchart illustrating a method of utilizing different projection parameters for different projection-mode triggers received at an electronic device 100. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium. The computer-readable code may be part of, for example, a projection module that controls the display of content in the projection mode. The projection module may be part of the operating system 146 or may be a stand-alone application.

At 302, one of a plurality of projection-mode triggers is received at the electronic device 100. The plurality of projection-mode triggers are each associated with respective projection parameters. The projection parameters associated with each projection-mode trigger may be predetermined or may be configured by the user.

As described above, different projection-mode triggers are received for different types of indirect viewing of the display 112 of an electronic device 100. For example, indirect viewing by placing the electronic device 100 in an HUD cradle 200 may be associated with a first projection-mode trigger, which is different than a second projection-mode trigger that may be associated with indirect viewing by tilting up an electronic device lying on a surface 220 with the display 112 facing down. In this way, receiving the first projection-mode trigger displays content 100 on the display 112 utilizing projection parameters that are configured for projecting content from the display 112 onto a reflector 204 of a HUD cradle 200. Receiving the second projection-mode trigger displays content 100 on the display 112 utilizing different projection parameters that are configured for projecting content from the display 112 onto a surface that the electronic device 100 is lying on, such as a table top.

By having different projection-mode triggers associated with different types of projection surfaces, projection parameters may be configured for the particular type projection surface that is being utilized for indirect viewing.

In an example, receiving the projection-mode trigger at 302 may comprise determining that the electronic device 100 is placed into an HUD cradle 200. The determination may be made, for example, by detecting via a sensor 210 that the device is placed in a HUD cradle 200. The sensor 210 may detect, for example, the presence of a stimulus element 212 located in the HUD cradle 212. As described above, in an example, the stimulus element 212 may be a magnet and the sensor 210 may be a Hall sensor, or the stimulus element 212 may be a protrusion and the sensor 210 may be a switch that is activated by the protrusion.

In another example, the stimulus element 212 may be a NFC tag and the sensor 210 may be an NFC reader that reads a signal output by the NFC tag. In an example, the signal provided by the NFC tag may include information about the particular HUD cradle 200 into which the NFC tag is included. Such information may include, for example, a model number, model name, manufacturer name, or information regarding the reflector 204 material such as, for example, the material type, the colour, the reflectivity of the reflector 204 material, or the angle between the reflector 204 and the display 112.

Different models of HUD cradles, or different materials of a reflector 204 of the HUD cradle, may each be associated with different projection-mode triggers. The associated projection parameters associated with the different projection-mode triggers may be configured for the particular HUD cradle 200 model or display characteristics of the reflector 204. The projection parameters for a particular HUD cradle 200 or reflector 204 may, for example, be stored in a memory of the electronic device 100, such as memory 110, or may be stored in the memory of a remote server, which the electronic device 100 may obtain via network 150. Other projection parameters for a particular HUD 200 or reflector 204 may be determined by, for example the sensor 210, such as the reflectivity of the reflector 204 and the angle 214 between the reflector 204 and the display 112 of the electronic device 100. In an example, the electronic device 100 may receive the model number of the HUD cradle 200 from information included in the signal from the NFC tag and may, based on the model number, obtain at least some of the projection parameters from the memory 110 or from a remote server over the network 150.

In another example, receiving the projection-mode trigger at 302 may comprise determining that the electronic device 100 is placed on a surface 220 with the display 112 facing down, then determining that the device 100 tilted upwards. The determination that the device 100 is tilted upwards may be made using an orientation sensor such as, for example, the accelerometer 136 or gyroscope of the electronic device 100. The angle 222 that the electronic device 100 is tilted may also be determined, with different tilt angles 222 associated with different projection-mode triggers. In this way, a smaller tilt angle 222 may be associated with projection parameters that are different than the projection parameters associated with a larger tilt angle 222. These projection-mode triggers may be received when the tilt angle 222 meets an associated threshold angle. There may be any number of threshold angles, each associated with a respective projection-mode trigger and projection parameters. As described in more detail below with reference to FIG. 4, the projection parameters associated with different tilt angles 222 may be include different sizes of regions of the display 112 on which information is displayed.

As described above, surfaces 220 with high gloss surfaces may better facilitate projection facilitating more information being reflected at lower angles than, for example, semi-gloss surfaces. In some examples, the threshold angles may be adjusted based on a determined texture of the surface 220 or a determined reflectivity from the surface 220. For example, smaller threshold angles may be utilized when the surface 220 is determined to be a high-gloss or high-reflectivity, whereas larger threshold angles may be utilized when the surface 220 is determined to be a semi-gloss or lower-reflectivity surface.

In response to receiving one of the plurality of projection-mode triggers at 302, the electronic device 100 initiates a projection mode at 304. Initiating the projection mode may comprise performing various actions at the electronic device 100. Initiating the projection mode may also include launching or opening a predetermined application on the electronic device 100. The predetermined application may be user-configurable or may be a default application. The predetermined application that is launched may be, for example, a navigation application.

Additionally, or alternatively, the electronic device 100 may disable or enable certain functionality of the device 100 in response to receiving the projection-mode trigger. For example, when a projection-mode trigger associated with a placing the electronic device 100 into a HUD cradle 200 such as disabling non-automotive authorized applications or disabling the keyboard.

Optionally, at 306 a signal may be sent to an application of the electronic device 100 indicating to the application that the projection mode has been initiated. This signal may be sent, for example, as part of launching an application upon entering projection mode. An application may be signaled at 306 if, for example, the application is configured for projection such that the application may alter content that the application generates for display on the display 112 when the device 100 has initiated a projection mode. In an example, the graphical elements of the application may include a tag or indication such as, for example, projection-enabled or projection-disabled, such that, when the projection mode is initiated at the electronic device 100, only those elements tagged as projection-enabled are displayed on the display 112. Tagged certain graphical elements of an application as projection-enabled facilitates the electronic device 100 optimizing the display of the projection-enabled graphical elements for the particular surface the display 112 projects onto, rather than each application having to reconfigure the projection-enabled graphical element according to the projection parameters.

Signaling at 306 may also include signaling to the application a size of the region on the display 112 in which content information from the application will be displayed. In this way, the application may, for example, fill in content information to fill the size of the region of display 112 on which the content will be displayed.

Alternatively, no signaling that a projection mode has been initiated at 306 may occur, in which case the applications are unaware that the projection mode has been initiated. In this case, the application outputs content information in the usual way and any altering of the content information that is output by the application is performed by the projection module after the content is output by the application, based on the projection parameters alone. This alternative may be desirable when, for example, the active application is not configured for projection.

At 308, content information for display on the display 112 is received from an application. The received content information may be received from an active application, such as for example an application launched or activated when the projection mode is initiated at 304, or any other application running on the electronic device 100. The content information received from an application that is projection configured may include, for example, graphical elements that are tagged as projection-enabled and projection-disabled. In this case, only those graphical elements tagged as projection-enabled will be displayed. Alternatively, the content information received from a projection configured application may include only those graphical elements tagged as projection-enabled. The content information may be received from applications that are unaware that the projection mode has been initiated and may be the same content information that would be received if the projection mode was not initiated at the electronic device 100.

At 310, the content information received from the application is altered based on the projection parameters associated with the projection-mode trigger received at 302.

In an example, projection parameters may be related to the colours utilized for displaying the content information. Altering the content information may, for example, include changing a colour of the content information to colours that are more easily visible when reflected from the surface that the display 112 projects onto. For example, altering the content information may include limiting the colours utilized to displaying the content information utilizing to primary colours only, or may include avoiding utilizing colours that are substantially similar to the colour of the reflective surface, or may include utilizing colours that increase the contrast between graphical elements and a background, or between graphical elements and the colour of the reflective surface.

In another example, the projection parameters may be related to the size or location of the content information should be displayed. For example, the projection parameters may determine a font size to be used for text such as, for example, a minimum font size. In this example, the content information may be altered such that any text included in the content information is larger than the minimum text size. In another example, the projection parameters may provide that content information is to be displayed in a particular location, in which case content information may be adjusting by translating the location of the content information to a specified location on the display 112.

In another example, the projection parameters may also provide that, for example, the content information to be displayed in a particular orientation, or in a particular region the display 112. The particular region may be defined by a specified size or location, or both. In this case, the content information may be adjusted to be in the specified orientation, or displayed in the region having the specified size and location. Adjusting the content information to be displayed in the region may include resizing the content information to fit within specified size of the region.

In another example, the projection parameters may also relate to the brightness setting of the display 112. In this example, adjusting the content information may include adjusting the brightness of the display 112. The projection parameters may also relate to mirroring the displayed content information. In this example, adjusting the content information may also include displaying a mirror image of the content information received from an application such that the reflection of the adjusted content information that is viewed by a user appears correctly to the user.

At 312, the adjusted content information is displayed on the display 112. Although not shown, it is understood that steps 308, 310, and 312 may be repeated as updated content information is received from an application.

In some examples, once an initial projection-mode trigger is received and the projection mode is initiated at the electronic device 100, a subsequent projection-mode trigger may be received. In this case, the projection parameters utilized to alter the content information may be dynamically changed from the projection parameters associated with the initial projection-mode trigger to the projection parameters associated with the subsequent projection mode trigger.

Figure 4A:
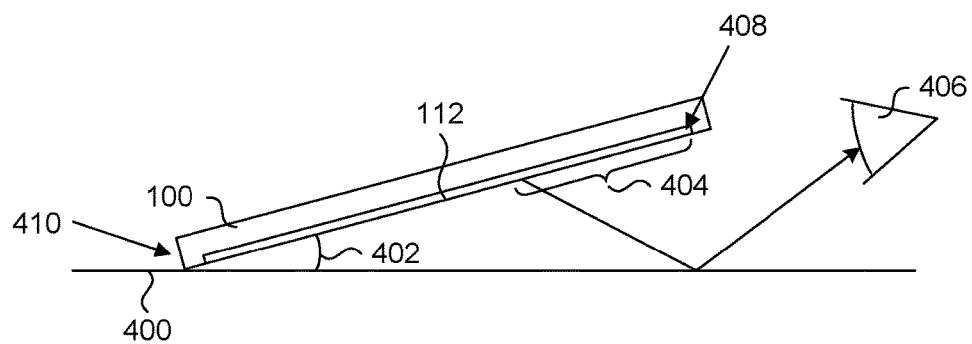
FIGS. 4A and 4B are schematic diagrams illustrating an example electronic device projecting content onto a surface for different tilt angles.
Figure 4B:
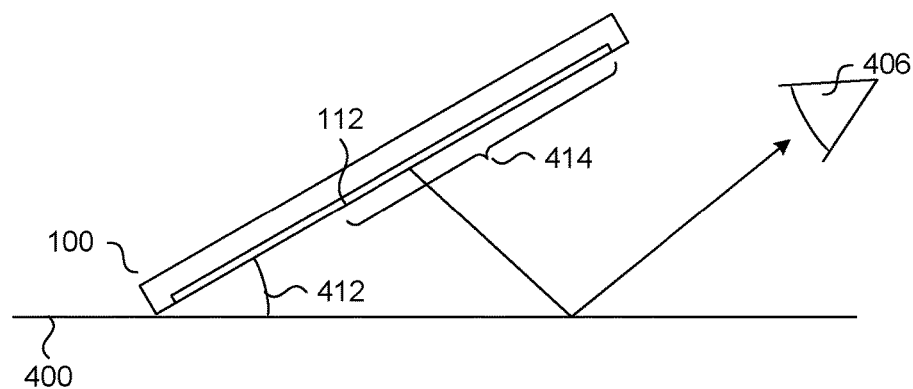

Referring now to FIGS. 4A and 4B, an example in which projection parameters may be dynamically changed is illustrated. FIG. 4A shows an electronic device 100 that is tilted upwards from a surface 400 by a tilt angle 402. Similar to the example described above with reference to FIG. 2A, an initial projection-mode trigger may be received when the user tilts an electronic device 100 from an initial position in which the display 112 is facing down on a surface 400 to a tilt position by rotating the electronic device 100 the tile angle 402. The projection parameters associated with the initial projection-mode trigger may include a first region 404 of the display 112 that the content information is displayed on. The initial project-mode trigger may be received when the tilt angle 402 meets or exceeds, for example, a first threshold angle. The first region 404 may be, for example, a region of the display 112 that is sized and located such that the reflection of the first region 404 off of the surface 400 is visible by the eye 406 of the user without being obscured by the electronic device 100. The location of the first region 404 may be along the side 408 of the display 112 that is opposite the side 410 that the electronic device 100 pivots from.

After the electronic device 100 has been tilted to meet or exceed the first tilt angle 402, the electronic device may be further tilted to a second tilt angle 412, as shown in FIG. 4B. Tilting the electronic device 100 further to the second tilt angle 412 may be received by the electronic device 100 as a subsequent projection-mode trigger having different associated projection parameters. For example, the projection parameters associated with the subsequent projection-mode trigger may include a region 414 of the display 112 in which content information is displayed having a size that is different than the size of the first region 404. Because the second tilt angle 412 is larger than the first tilt angle 402 in the example shown in FIGS. 4A and 4B, the second region 414 is larger than the first region 404. The subsequent projection-trigger may be received when, for example, the second tilt angle 412 meets or exceeds a second threshold angle. Although FIGS. 4A and 4B illustrate two projection-mode triggers associated with two tilt angles, in practice more than two projection-mode triggers may be associated with respective different threshold tilt angles, each projection-mode trigger having associated projection parameters.

Figure 5:
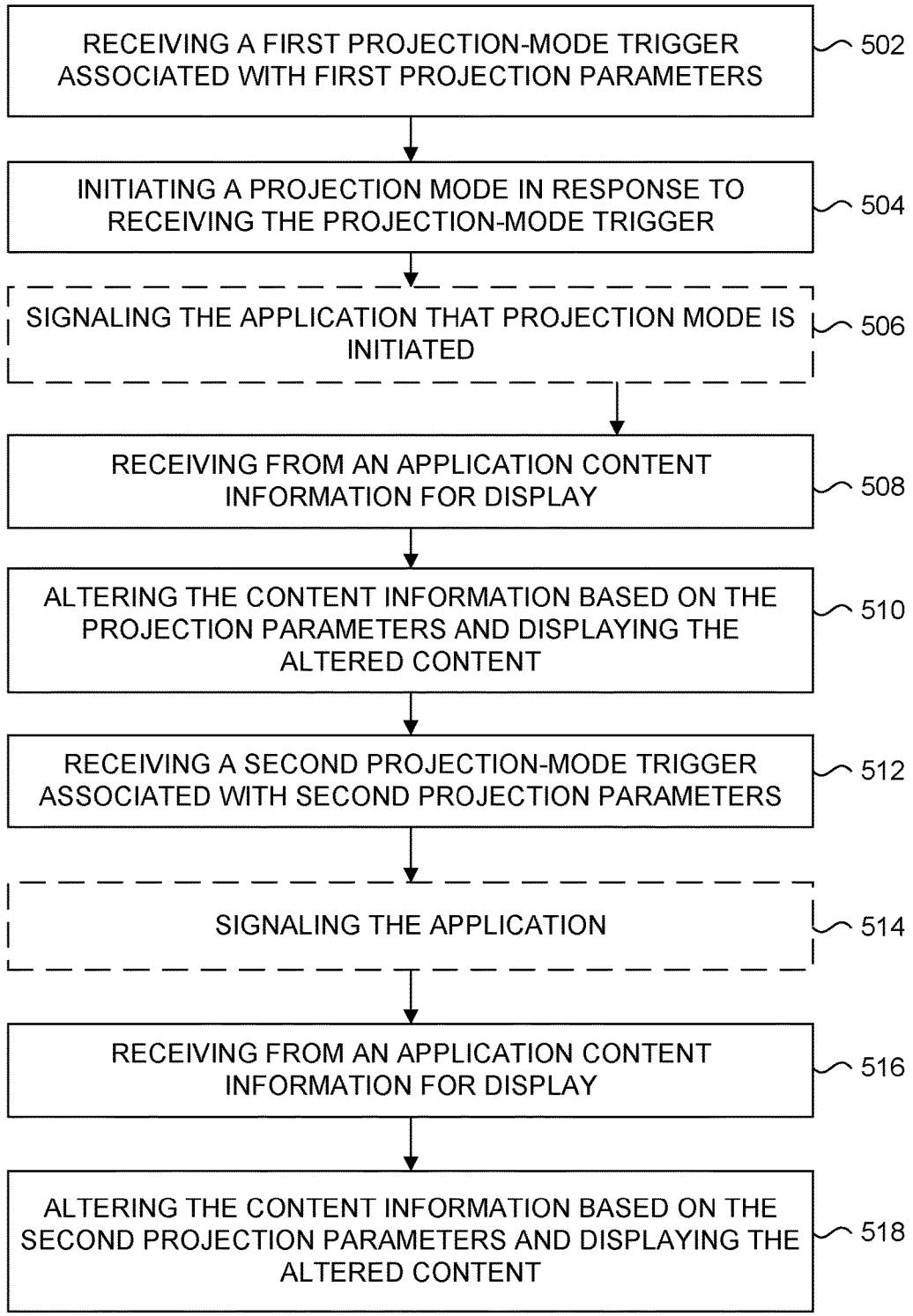
FIG. 5 is a flowchart illustrating a method of dynamically changing the projection parameters utilized to project content onto a surface in accordance with another embodiment.

Referring now to FIG. 5, a flowchart illustrating a method of dynamically changing the projection parameters utilized for adjusting the content information for display in a projection mode of an electronic device 100 is shown. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium. The computer-readable code may be part of, for example, a projection module that controls the display of content in the projection mode. The projection module may be part of the operating system 146 or may be a stand-alone application.

At 502, a first projection-mode trigger is received. The first projection-mode trigger is associated with first projection parameters. Receiving the first projection-mode trigger may comprise, for example, determining that the electronic device 100 is tilted from an initial position in which the display 112 is facing down a first tilt angle that meets a first threshold, as illustrated in FIG. 4A. The first projection-mode trigger may be received when, for example, the first tilt angle meets a first threshold angle. The first projection parameters may include, for example, a size of a first region on the display 112 on which content information is displayed.

In response to receiving the first projection mode trigger at 502, a projection mode is initiated at the electronic device 100 at 504, an application is optionally signaled that projection mode is initiated at 506, content information is received from the application at 508, the content information is altered based on the first projection parameters and displaying the altered content at 510. Steps 504, 506, 508, and 510 are substantially similar to steps 304, 306, 308, 310, and 312 described above with reference to FIG. 3 and therefore are not further described herein to avoid repetition.

At 512, a second projection-mode trigger is received, the second projection-mode trigger having associated second projection parameters. Receiving the second projection-mode trigger may comprise, for example, determining that the electronic device 100 is tilted from the first tilt angle to a second tilt angle, as illustrated in FIG. 4B. The second projection-mode trigger may be received when, for example, the second tilt angle meets a second threshold angle. The second projection parameters may include, for example, a size of a second region on the display 112 on which content information is displayed.

Optionally, at 514, the application may be signaled to indicate the change from the first projection parameters to the second projection parameters. For example, in the example shown in FIGS. 4A and 4B, the size of the first region may be sent to application at 506 and the size of the second region may be sent to the application at 514 to enable the application to fill in the region with content information based on the size of the region.

At 516, content information is received from the application. This content information 516 may be, for example, updated content information compared to the content information that was received at 508. If the content information has not changed since the content information received at 508, then step 516 may be skipped, or the content information received at 508 may be received again at 516.

At 518, the content information is adjusted based on the second projection parameters and the adjusted content information is displayed on the display 112.

In this way, the projection parameters may be dynamically changed such that the content information may be dynamically adjusted when, for example, the tilt angle that a user is utilizing to view the display 112 indirectly changes.

The present disclosure provides for receiving different projection-mode triggers, each having associated projection parameters. The different projection-mode triggers may be received in different contexts for indirect viewing of a display screen, such as placing the device in a HUD cradle, or tilting a device upward from a surface. The projection parameters are utilized to adjust the content information displayed on the display such that content information may be adjusted differently for projection onto different surfaces. The present disclosure also provides for dynamically adjusting the projection parameters utilized for adjusting the displayed content information. The present disclosure facilitates enabling projection of content information from applications that are not configured for a projection mode of an electronic device by adjusting the content information for projection. In this way, any application, whether configured for projection or not, may be projected onto a surface.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an electronic device, the method comprising:
receiving one of a first and second projection-mode triggers, each projection-mode trigger having associated first and second projection-mode display parameters,
wherein the first projection mode trigger comprises sensing by a first sensor of the electronic device that the electronic device is placed in a heads-up-display (HUD) cradle and the display parameters associated with the first projection-mode trigger are configured for projection onto a reflective surface of the HUD display cradle, and
wherein the second projection mode trigger comprises sensing by a second sensor the electronic device that the electronic device is moved from an initial position in which the electronic device is on a surface with the display of the electronic device facing downwards to a tilted position in which the electronic device is tilted up from the surface and the display parameters associated with the second projection-mode trigger are configured for projection onto the surface in the tilted position;
receiving, from an application, content information for display on a display of the electronic device;
in response to receiving the first projection mode trigger:
initiating a first projection mode at the electronic device in which the content information is altered based on the first display parameters associated with the first projection-mode trigger to generate first altered content information configured for projection onto the reflective surface of the HUD display cradle, and
displaying the first altered content information on the display of the electronic device; and
in response to receiving the second projection mode trigger:
initiating a second projection mode at the electronic device in which the content information is altered based on the second display parameters associated with the second projection-mode trigger to generate second altered content information configured for projection onto the surface in the tilted position, and
displaying the second altered content information on the display of the electronic device.

2. The method according to claim 1, wherein sensing that the electronic device is placed in the HUD cradle comprises detecting a near field communication (NFC) tag of the HUD cradle.

3. The method according to claim 2, wherein detecting the NFC tag includes receiving information from the NFC tag including at least one of the model of the HUD cradle and display characteristics of the reflective surface of the HUD cradle;
the first display parameters associated with the first projection-mode trigger are based on the display characteristics of the reflective surface determined from the information received from the NFC tag.

4. The method according to claim 3, wherein the first display characteristics include one or more of: a material of the reflective surface; a reflectivity of the reflective surface; a colour of the reflective surface; and an angle between the reflective surface and the display.

5. The method according to claim 1, wherein the second display parameters are determined by a tilt angle of the electronic device in the tilt position.

6. The method according to claim 1, wherein the second display parameters include at least one of: mirroring the content information; changing a colour of the content information; changing the size of the content information; changing the brightness of the display; translating the content information; and adding or removing displayed elements.

7. The method according to claim 1, wherein the application is projection-configured, the method further comprising:
signaling to the application that the first or second projection-mode is initiated, the signalling including at least a size of a portion of the display that is to be projected.

8. The method according to claim 7, wherein, when the second projection mode trigger is received,
the size of the portion are based on a tilt angle of the electronic device in the tilted position, and
the method further comprising in response to detecting a change in the tilt angle of the electronic device, signaling the application at least one of a second size of a second portion of the display that is to be projected.

9. A non-transitory computer-readable storage medium having computer-readable code executable by at least one processor of an electronic device to:
receive one of a first and second projection-mode triggers, each projection-mode trigger having associated first and second projection-mode display parameters,
wherein the first projection mode trigger comprises sensing by a first sensor of the electronic device that the electronic device is placed in a heads-up-display (HUD) cradle and the display parameters associated with the first projection-mode trigger are configured for projection onto a reflective surface of the HUD display cradle, and
wherein the second projection mode trigger comprises sensing by a second sensor the electronic device that the electronic device is moved from an initial position in which the electronic device is on a surface with the display of the electronic device facing downwards to a tilted position in which the electronic device is tilted up from the surface and the display parameters associated with the second projection-mode trigger are configured for projection onto the surface in the tilted position;
receive, from an application, content information for display on a display of the electronic device;
in response to receiving the first projection mode trigger:
initiate a first projection mode at the electronic device in which the content information is altered based on the first display parameters associated with the first projection-mode trigger to generate first altered content information configured for projection onto the reflective surface of the HUD display cradle, and
display the first altered content information on the display of the electronic device; and
in response to receiving the second projection mode trigger:
initiate a second projection mode at the electronic device in which the content information is altered based on the second display parameters associated with the second projection-mode trigger to generate second altered content information configured for projection onto the surface in the tilted position, and
display the second altered content information on the display of the electronic device.

10. An electronic device comprising:
  a display;
  a first sensor and a second sensor;
  a processor coupled to the display and programmed to:
    receive one of a first and second projection-mode triggers, each projection-mode trigger having associated first and second projection-mode display parameters,
      wherein the first projection mode trigger comprises sensing by the first sensor of the electronic device that the electronic device is placed in a heads-up-display (HUD) cradle and the display parameters associated with the first projection-mode trigger are configured for projection onto a reflective surface of the HUD display cradle, and
      wherein the second projection mode trigger comprises sensing by the second sensor the electronic device that the electronic device is moved from an initial position in which the electronic device is on a surface with the display of the electronic device facing downwards to a tilted position in which the electronic device is tilted up from the surface and the display parameters associated with the second projection-mode trigger are configured for projection onto the surface in the tilted position;
    receive, from an application, content information for display on a display of the electronic device;
    in response to receiving the first projection mode trigger:
      initiating a first projection mode at the electronic device in which the content information is altered based on the first display parameters associated with the first projection-mode trigger to generate first altered content information configured for projection onto the reflective surface of the HUD display cradle, and
      displaying the first altered content information on the display of the electronic device; and
    in response to receiving the second projection mode trigger:
      initiating a second projection mode at the electronic device in which the content information is altered based on the second display parameters associated with the second projection-mode trigger to generate second altered content information configured for projection onto the surface in the tilted position, and
      displaying the second altered content information on the display of the electronic device.

11. The electronic device according to claim 10, wherein sensing that the electronic device is placed in the HUD cradle comprises detecting a near field communication (NFC) tag of the HUD cradle.

12. The electronic device according to claim 11, wherein detecting the NFC tag includes receiving information from the NFC tag including at least one of the model of the HUD cradle and display characteristics of the reflective surface of the HUD cradle;
  the first display parameters associated with the first projection-mode trigger are based on the display characteristics of the reflective surface determined from the information received from the NFC tag.

13. The electronic device according to claim 12, wherein the first display characteristics include one or more of: a material of the reflective surface; a reflectivity of the reflective surface; a colour of the reflective surface; and an angle between the reflective surface and the display.

14. The electronic device according to claim 10, wherein the second display parameters are determined by a tilt angle of the electronic device in the tilt position.

15. The electronic device according to claim 10, wherein the second display parameters include at least one of: mirroring the content information; changing a colour of the content information; changing the size of the content information; changing the brightness of the display; translating the content information; and adding or removing displayed elements.

16. The electronic device according to claim 10, wherein the application is projection-configured, the method further comprising:
  signaling the application that the first or second projection-mode is initiated, the signalling including at least a size of a portion of the display that is to be projected.

17. The electronic device according to claim 16, wherein, when the second projection mode trigger is received,
  the size of the portion are based on a tilt angle of the electronic device in the tilted position, and
  the method further comprising in response to detecting a change in the tilt angle of the electronic device, signaling the application at least one of a second size of a second portion of the display that is to be projected.

* * * * *